United States Patent [19]

Fujioka

[11] Patent Number: 5,719,387
[45] Date of Patent: Feb. 17, 1998

[54] IC CARD INCLUDING A MEMORY, A PASSWORD COLLATING MEANS AND AN ACCESS PERMITTING MEANS FOR PERMITTING ACCESS TO THE MEMORY

[75] Inventor: Shuzo Fujioka, Hyogo, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 502,729

[22] Filed: Jul. 14, 1995

[30] Foreign Application Priority Data

Mar. 29, 1995 [JP] Japan .................................. 7-71778

[51] Int. Cl.$^6$ ................................................ G06K 19/06
[52] U.S. Cl. ................................... 235/492; 235/382
[58] Field of Search .............................. 235/381, 382, 235/382.5, 383, 385, 488, 492, 493

[56] References Cited

U.S. PATENT DOCUMENTS

| | | | |
|---|---|---|---|
| 4,849,614 | 7/1989 | Watanabe | 235/379 |
| 4,882,474 | 11/1989 | Anderl | 235/380 |
| 4,885,788 | 12/1989 | Takaragi | 380/23 |
| 4,960,982 | 10/1990 | Takahira | 235/382 |

*Primary Examiner*—Donald T. Hajec
*Assistant Examiner*—Karl French
*Attorney, Agent, or Firm*—Lowe, Price, LeBlanc & Becker

[57] ABSTRACT

A non-contact type IC card includes a programmable memory divided into a user area for storing application data, and a system area for storing a system password and a system password effective code indicating requirement of collation of the system password. If the system area of the memory includes the system password effective code, access to the system area by an external apparatus is permitted only when passwords are identical as a result of password collation. If the system area does not include the system password effective code, the access by the external apparatus can be permitted without the password collation.

5 Claims, 8 Drawing Sheets

IC CARD INCLUDING A MEMORY, A PASSWORD COLLATING MEANS AND AN ACCESS PERMITTING MEANS FOR PERMITTING ACCESS TO THE MEMORY

BACKGROUND OF THE INVENTION

1. Field of the Invention

The present invention relates to a non-contact type IC card having a programmable memory, to realize data communication by a radio wave or the like.

2. Description of the Related Art

For example, a system is being developed in which a non-contact type IC card is used as a commuter pass for train, and it is checked whether or not the commuter pass is valid based on data communication between the IC card and a read/write apparatus disposed at a ticket gate.

Figure 9:
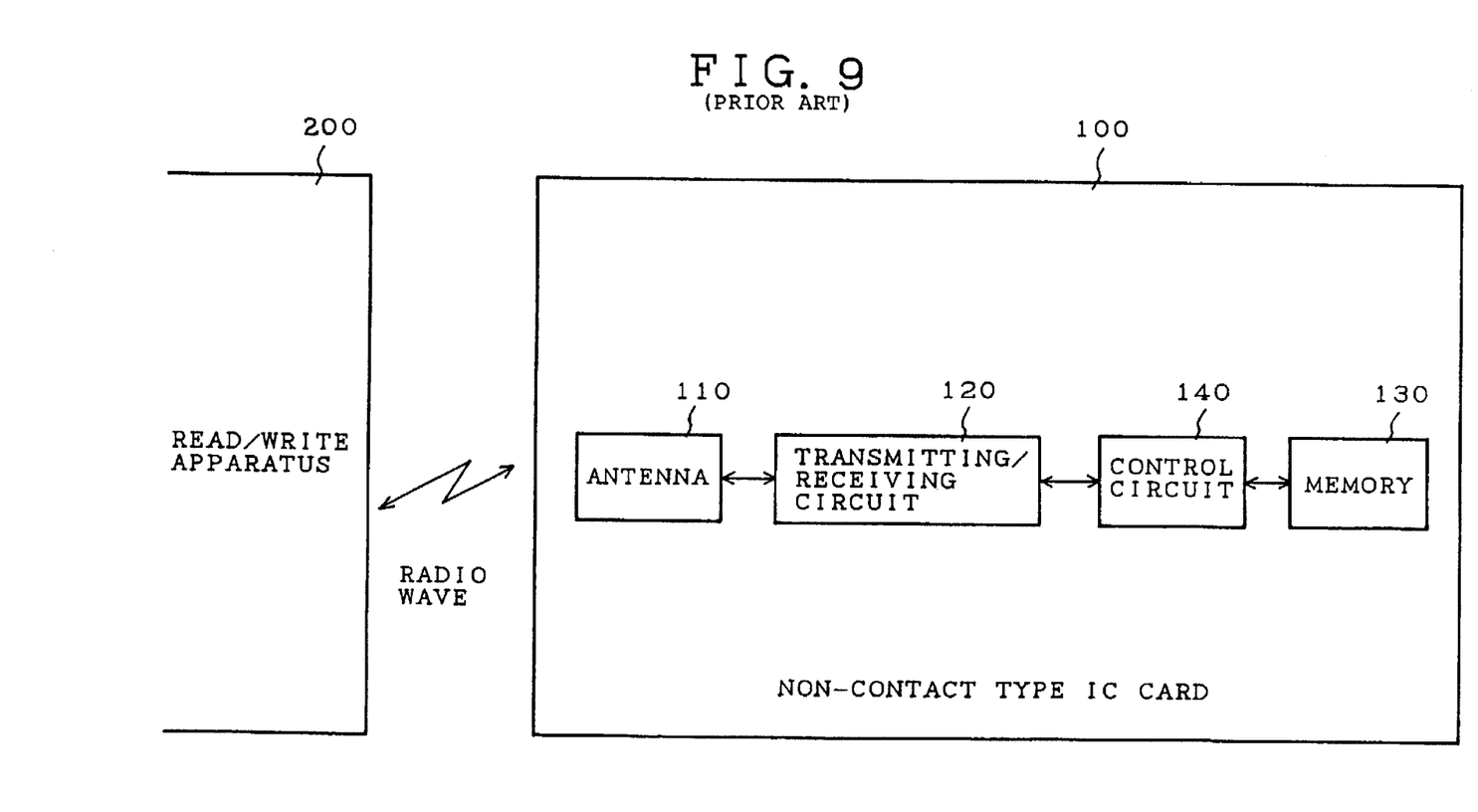
FIG. 9 is a block diagram showing a structure of a conventional non-contact type IC card.

FIG. 9 is a block diagram showing a structure of the conventional non-contact type IC card. In the drawing, reference numeral 100 denotes the non-contact type IC card, 200 denotes the read/write apparatus to communicate with the non-contact type IC card 100, 110 denotes an antenna to convert electric signal into a radio wave, and convert the radio wave into a high-frequency signal for transmission and reception of the radio wave between the read/write apparatus and the antenna. Further, reference numeral 120 denotes a transmitting/receiving circuit to convert the high-frequency signal converted by the antenna 110 into a digital signal, and convert the digital signal into a high-frequency signal to be supplied to the antenna 110, 130 denotes a memory to contain data, and 140 denotes a control circuit to control each section of the non-contact type IC card 100, and to process data for the non-contact type IC card 100. The read/write apparatus 200 sends a command to the non-contact type IC card 100 through the radio wave, and the non-contact type IC card 100 executes the command and sends back the result of the execution to the read/write apparatus 200.

Figure 10:
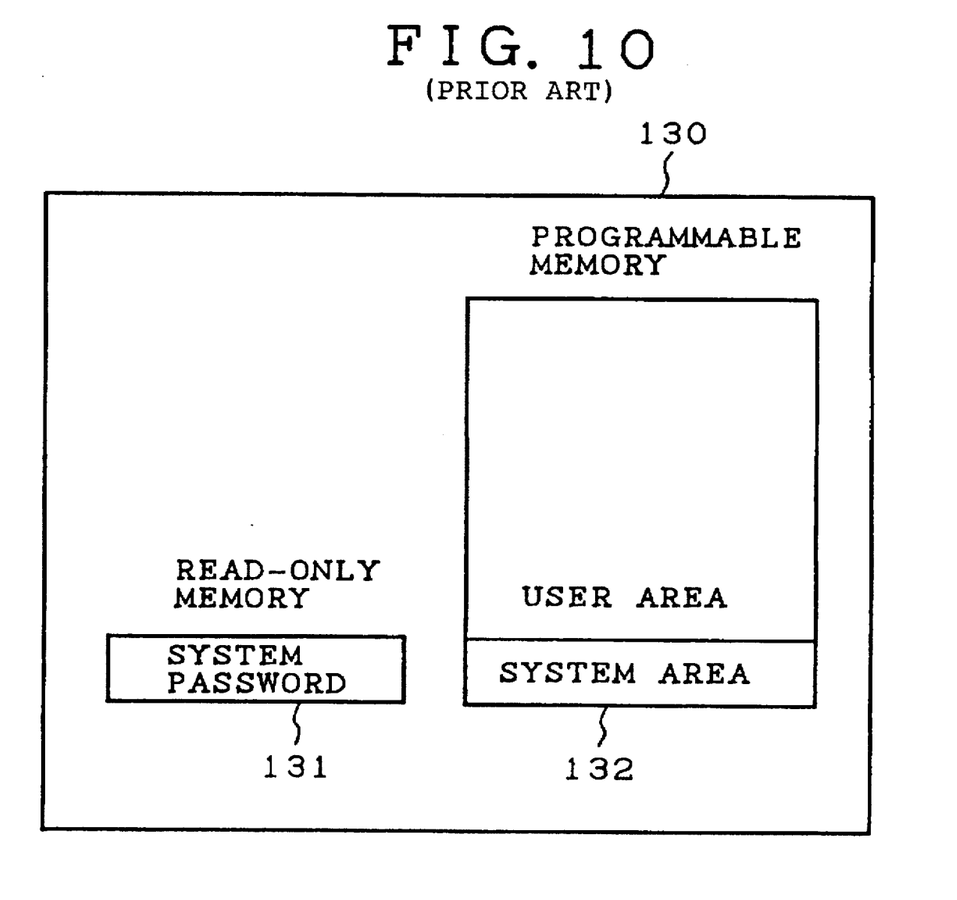
FIG. 10 is a diagram showing a structure of the memory shown in FIG. 9.

FIG. 10 is a diagram showing a structure of the memory 130. As shown in the drawing, the memory 130 includes a read-only memory 131 to contain a system password, and a programmable memory 132 divided into a system area and a user area. When the read/write apparatus 200 sends an access command for the system area to the non-contact type IC card 100, the command is sent together with a system password. Subsequently, the password is collated with the system password stored in the read-only memory 131 in the non-contact type IC card 100. Only when the passwords are identical with each other, the system area is accessible. Hence, there is a problem that a test of the memory in the IC card becomes troublesome because a test of the system area requires the password. Further, since the system password is stored in the read-only memory 131, it is difficult to change the password. Hence, there is another problem that a counterplot cannot easily be considered when, for example, the password is leaked out.

The conventional non-contact type IC card is provided as set forth above. Thus, there are problems of the troublesome test of the memory, difficulty in change of the password, and so forth.

SUMMARY OF THE INVENTION

In view of the foregoing, it is an object of the present invention to provide an IC card in which a test of a memory can simply be carried out, and a password can easily be changed.

According to the present invention, there is provided an IC card having a memory including a system area having a system password storage area for storing a system password used for collation when an external apparatus accesses the system area, and a password information storage area for storing first information indicating that collation of the system password stored in the system password area is required when the system area is accessed, password collating means for, when the first information is stored in the password information storage area, collating a password sent from the external apparatus when the system area is externally accessed with the system password stored in the system password storage area, and access permitting means for, if the first information is stored in the password information storage area, permitting the access by an external apparatus only when the passwords are identical as a result of the collation in the password collating means, and for permitting the access by the external apparatus without password collation if the first information is not stored in the password information storage area. Hence, it is possible to permit the access without a password when an IC card is tested, resulting in reduction of a time required for the test.

Further, according to the present invention, there is provided an IC card in which a system area includes an extended system area information storage area for storing second information indicating that an area having a predetermined size in a user area is used as an extended system area, and access permitting means permits, if the second information is stored in the extended system area information storage area, access by the external apparatus when an inputted password is identical with a system password stored in a system password storage area as a result of collation in password collating means when access is made to the extended system area by the external apparatus. Hence, it is possible to provide a variable range in which the system password is effective, resulting in applicability to various types of systems.

Further, according to the present invention, there is provided an IC card in which an extended system area has a user area password storage area for storing a user area password used for collation when access is made to a user area. The IC card further has user area password collating means for, when an external apparatus accesses the user area with a password, collating the password with the user area password stored in the extended system area, and access permitting means permits the access to the user area when the passwords are identical with each other as a result of the collation in the user area password collating means. Hence, there is an effect in that security in the user area can be improved by the password collation.

Further, according to the present invention, there is provided an IC card in which a user area password storage area includes a read password used for collation when a read command is sent together with a password from an external apparatus, and a write password used for collation when a write command is sent together with a password from the external apparatus, and user area password collating means collates the password with any one of the read password and the write password depending upon a type of the command inputted from the external apparatus. Hence, there is an effect in that the user area can effectively be controlled with higher security depending upon the type of command.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Preferred embodiments of the invention will now be described in detail referring to the accompanying drawings.

Embodiment 1

Figure 1:
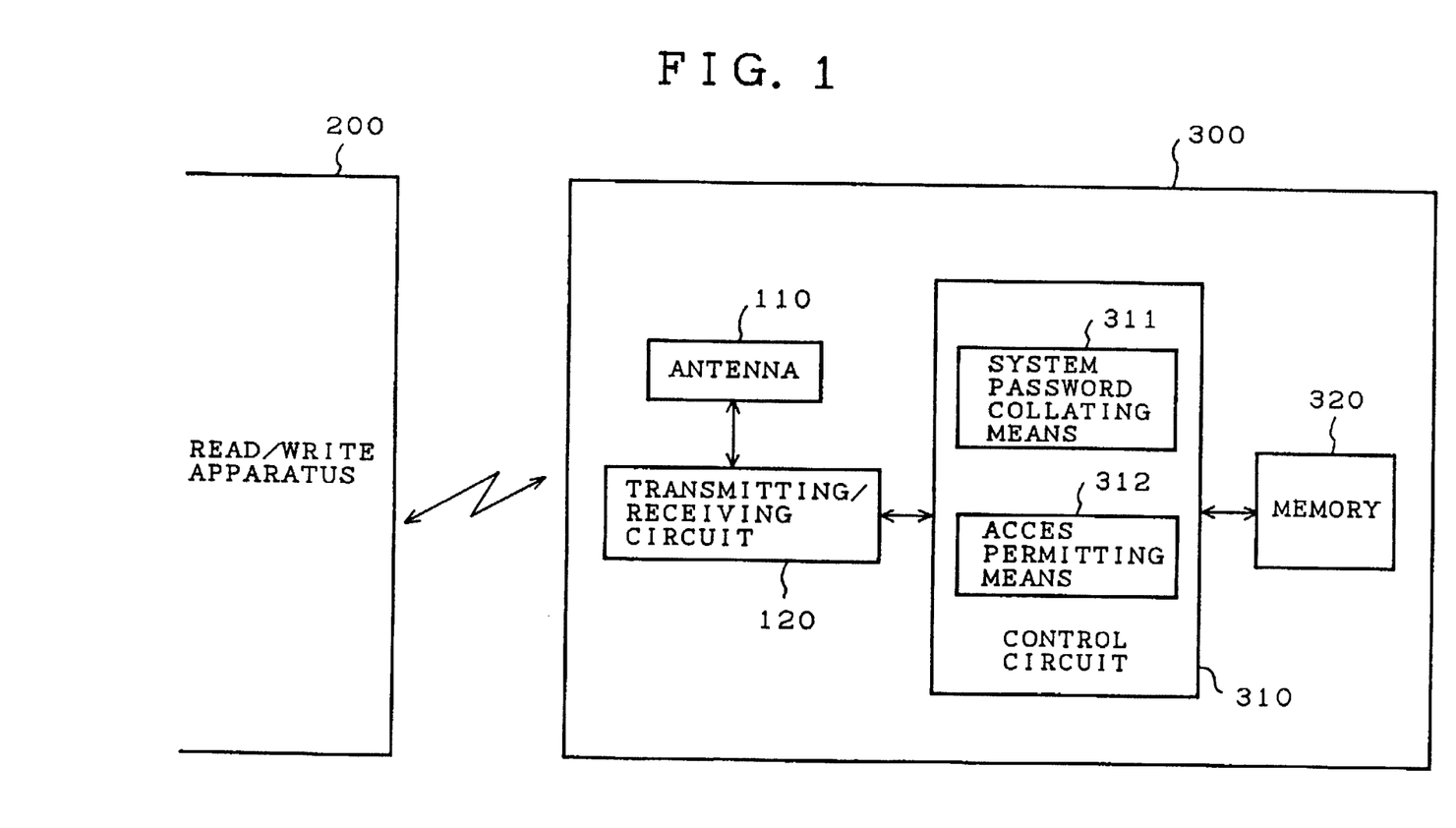
FIG. 1 is a diagram showing a structure of a first embodiment of a non-contact type IC card of the present invention.

FIG. 1 is a diagram showing a structure of a non-contact type IC card in the embodiment 1 of the present invention. The same reference numerals are used for component parts identical with those in a conventional non-contact type IC card shown in FIG. 9, and duplicate descriptions thereof are omitted. In the drawing, reference numeral 300 denotes the non-contact type IC card in this embodiment, 310 denotes a control circuit to control each section of the non-contact type IC card 300 and to process data, and 320 denotes a programmable memory to contain data.

Figure 2:
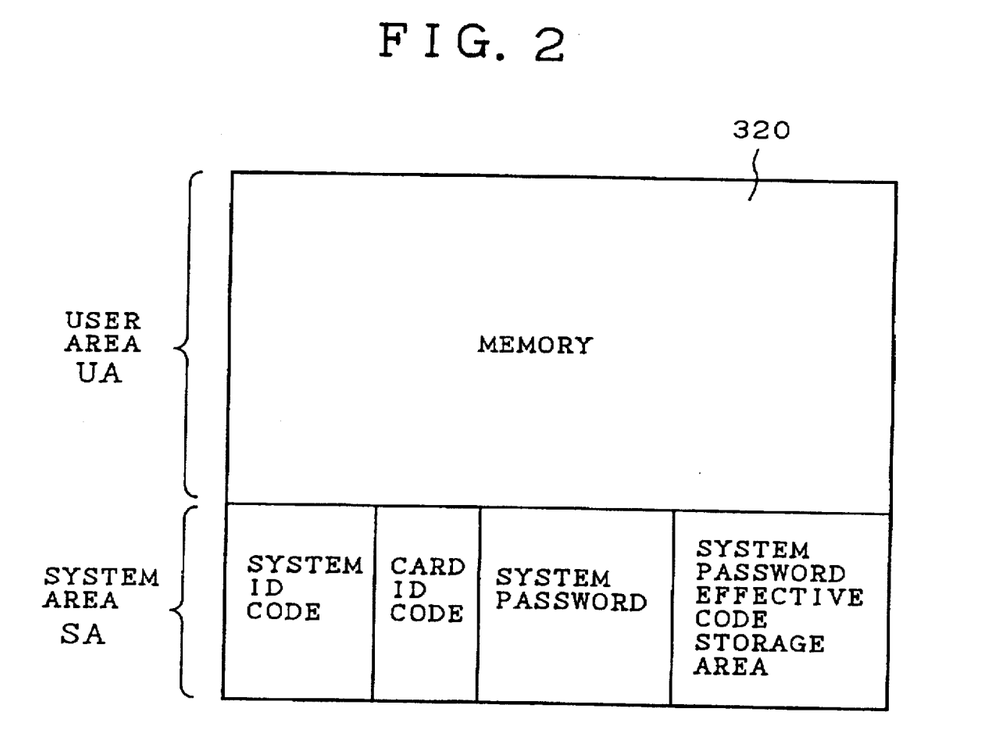
FIG. 2 is a diagram showing a memory map of a memory in the non-contact type IC card shown in FIG. 1.

FIG. 2 is a diagram showing a memory map of the memory 320. As shown in the drawing, the memory 320 is divided into a user area UA and a system area SA. The user area UA is used for application data such as personal information or account data of a user of the non-contact type IC card 300. The system area SA is used to control the non-contact type IC card 300. A system identifier, a card identifier, a system password, and a system password effective code (first information) for making the system password effective to the system area SA are stored in the system area SA. After the system password effective code is stored in a system password effective code storage area, and a read/write apparatus (an external apparatus) 200 sends a password in addition to commands for read/write access to the non-contact type IC card 300, it is possible to permit the access to the system area only when the password is identical with the system password stored in the system area SA.

Further, the control circuit 310 includes system password collating means 311, and access permitting means 12. In the system password collating means 311, the system password sent together with the command from the read/write apparatus 200 is collated with the system password stored in the system area SA of the memory 320. The access authorizing means 312 permits access by the read/write apparatus 200 so as to execute the command only when the system password effective code having a particular pattern is stored in the system password effective code storage area of the system area SA, and the sent password is identical with the password stored in the system area SA. If the system password effective code storage area does not contain the system password effective code having a particular pattern such as "B9H", the access by the read/write apparatus 200 can also be permitted even if passwords are unequal as a result of the system password collation. Further, if the system password effective code storage area does not include the system password effective code having the particular pattern, even when a command is inputted without a password from the read/write apparatus 200, the command is permitted to access and can be executed.

When the read/write apparatus 200 reads data in the user area UA of the memory 320 in the non-contact type IC card 300, the read/write apparatus 200 sends a read command and a read address as radio waves to the non-contact type IC card 300. In the non-contact type IC card 300, an antenna 110 converts the sent radio waves into high-frequency signals, and a transmitting/receiving circuit 120 demodulates and decodes the signals so as to transfer the read command and the read address to the control circuit 310. Since access to the user area UA requires no password collation, the read command is permitted by the access permitting means 312. Consequently, data in the memory 320 corresponding to the read address is read out and is transmitted as radio waves to the read/write apparatus 200 through the transmitting/receiving circuit 120 and the antenna 110.

When data is written from the read/write apparatus 200 into the non-contact type IC card 300, a write command, a write address, and write data are transmitted as radio waves in the same manner as in the above data read operation. In the non-contact type IC card 300, the write command, the write address, and the write data are transferred to the control circuit 310 as in the data read operation. Since the access to the user area UA requires no password collation, the write command is permitted by the access permitting means 312. Consequently, the write data is written to the memory 320 at the write address.

A description will now be given of a characteristic operation in the embodiment, that is, of the access to the system area SA of the memory 320. For reading from and writing onto the system area SA in the non-contact type IC card 300, the read/write apparatus 200 transmits a command with a password to the non-contact type IC card 300. In the non-contact type IC card 300, the system password collating means 311 initially confirms whether or not the particular code is stored in the system password effective code storage area of the system area SA. In actuality, when the non-contact type IC card 300 is initiated, data in the system password effective code storage area is transferred to a register provided in the control circuit 310. Further, it is confirmed whether or not the particular code is stored by referring to a signal outputted from the register. Structures of the register and other component parts will be described infra in detail.

When the particular code is not stored in the system password effective code storage area, the system area can be accessed without addition of the system password. Therefore, as in the access to the user area UA, the access permitting means 312 of the control circuit 310 can authorize and execute commands such as the read command, or the write command by simply sending the command without a password from the read/write apparatus 200.

When, for example, a test of the memory 320 is made before the non-contact type IC card 300 is issued, the system area SA is accessed without storing the system password effective code having the particular pattern in the system password effective code storage area. In such a manner, it is possible to provide the access to the system area SA without password collation. That is, when the system password effective code having the particular pattern is not stored in the system password effective code storage area, the read/write apparatus 200 can make access to the system area SA as in the access to the user area UA. As a result, it is possible to reduce a time period required for the test.

In particular, immediately after the memory 320 is manufactured, that is, immediately after the completion of wafer process, it is impossible to grasp an exact value of an area for storing the system password. Thus, it is important to enable the access to the system area SA without collation of the system password. Hence, it is desirable to avoid codes, including "00H", "01H", "03H", "07H", "0FH", "1FH", "7FH", "FFH", and so forth, as a system password effective code of the system area SA in the memory 320 because data tend to become these codes immediately after the completion of the wafer process of the memory. Further, it is also desirable to avoid other codes including "00H", "FFH", "55H", and "AAH", which are stored in the memory during the test. In the embodiment, a code "B9H" is employed for the system password effective code storage area.

Subsequently, after the completion of the test, when the non-contact type IC card 300 is issued in actuality, a system password write command is sent to the non-contact type IC card 300 from the read/write apparatus 200 or the like. According to the command, the system password is set in the system area SA in the non-contact type IC card 300. Thereafter, a command to write "B9H" to the system password effective code storage area is sent to the non-contact type IC card 300 from the read/write apparatus 200 or the like. Execution of the command makes the system password effective so that collation of the system password is required to make access to the system area SA by the read/write apparatus 200. As a result, it is possible to ensure security in the issued non-contact type IC card 300. Even after the IC card is once issued, the system password can be changed as long as the system password is known. If a password for an entire system is changed at a constant interval, extremely high security can be obtained.

Figure 3:
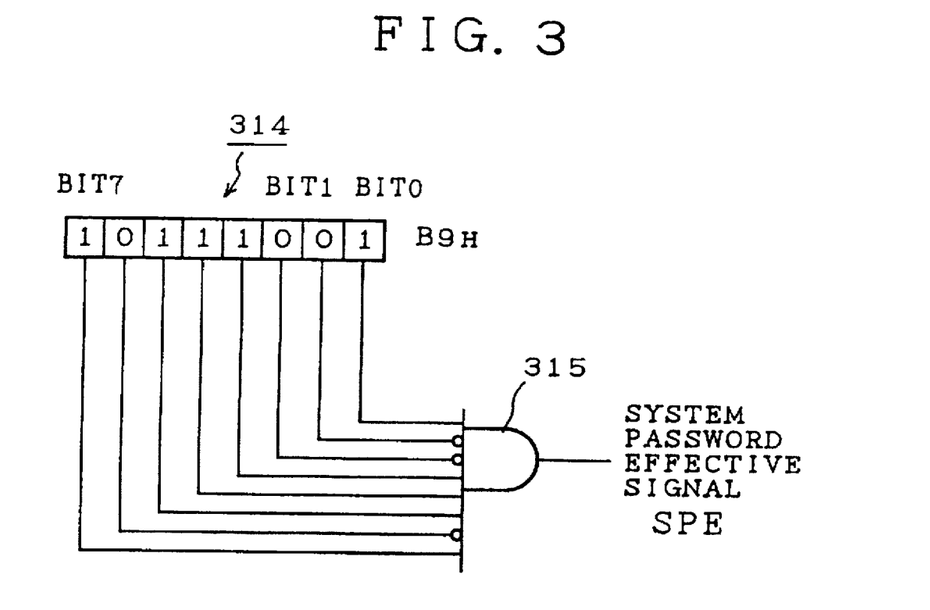
FIG. 3 is a diagram showing a system password effective signal generating circuit using an 8-bit register in the first embodiment.

Next, a system password effective signal will be discussed. FIG. 3 is a circuit diagram showing a circuit to generate the system password effective signal (SPE). In the drawing, reference numeral 314 denotes an 8-bit register to which the data in the system password effective code storage area is transferred when the non-contact type IC card 300 is initiated, and the data is stored in the register 314. Reference numeral 315 denotes a gate to output a signal "H" when the register 314 becomes "B9H." Each time the non-contact type IC card 300 is initiated, the data in the system password effective code storage area is loaded to the register 314. The system password effective signal SPE becomes a signal "H" only when the system password is effective. Therefore, when the system password effective signal SPE is "L," the access permitting means 312 decides that the collation of the system password is not required for the access to the system area SA. Otherwise, when the SPE is "H," the access permitting means 312 decides that the collation is necessary.

Figure 4:
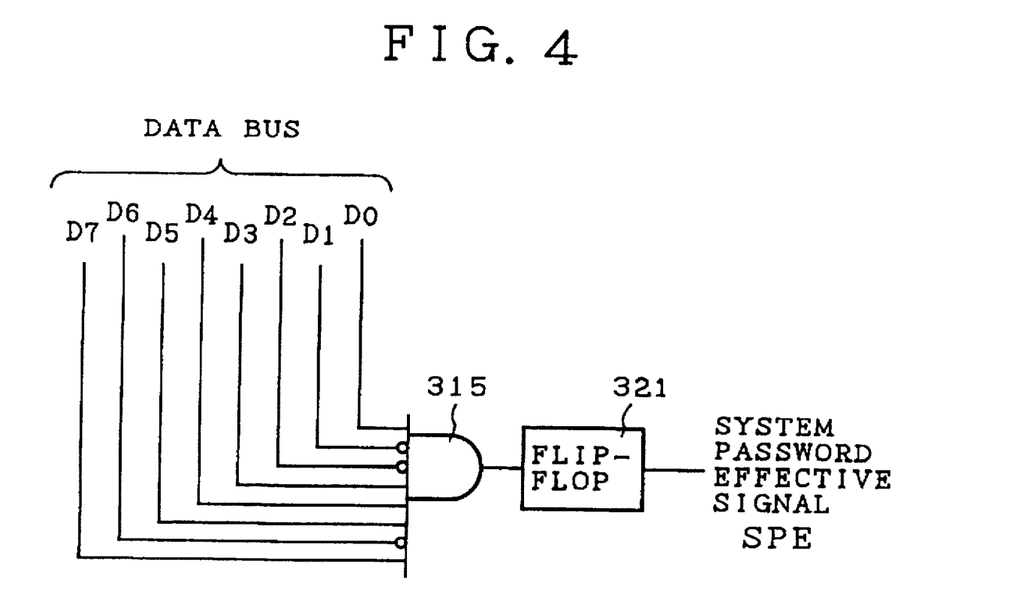
FIG. 4 is a diagram showing a system password effective signal generating circuit using one flip-flop in the first embodiment.

Though the 8-bit register 314 is employed in the system password effective signal generating circuit shown in FIG. 3, it must be noted that a flip-flop 321 serving as a 1-bit register may be employed as shown in FIG. 4. In this case, when the non-contact type IC card 300 is initiated, data in the system password effective code storage area in the memory 320 is read. Further, it is set in the flip-flop 321 whether or not the data is "B9H." An output signal from the flip-flop 321 can be employed as the system password effective signal SPE.

Embodiment 2

Figure 5:
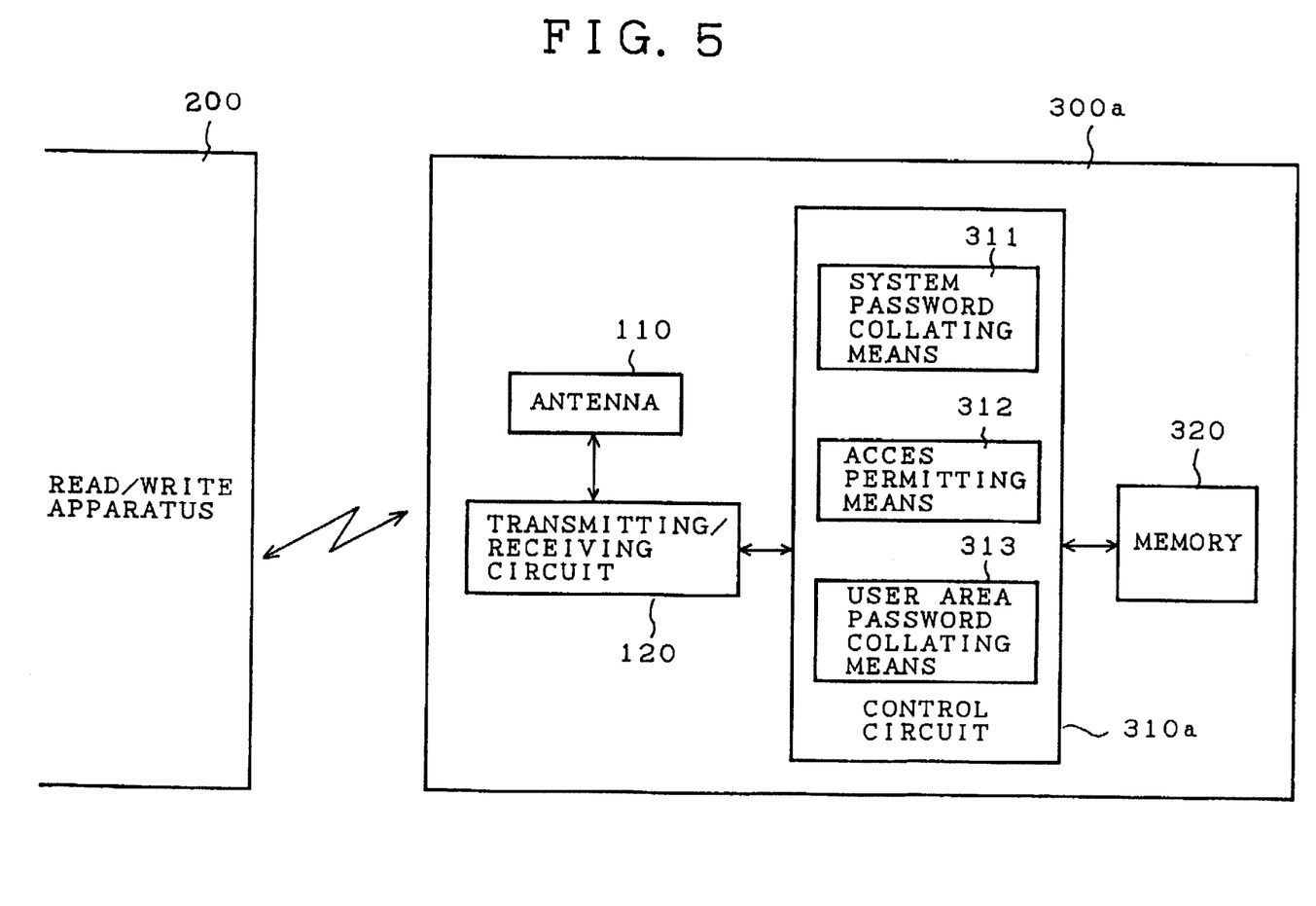
FIG. 5 is a diagram showing a structure of a second embodiment of the non-contact type IC card of the present invention.

FIG. 5 is a diagram showing a structure of a non-contact type IC card in the embodiment 2 of the present invention. The same reference numerals are used for component parts identical with those in the non-contact type IC card shown in FIG. 1, and duplicate descriptions thereof are omitted. In the drawing, reference numeral 300a denotes the non-contact type IC card in the embodiment, and 310a denotes a control circuit to control each section of the non-contact type IC card 300a and to process data.

Figure 6:
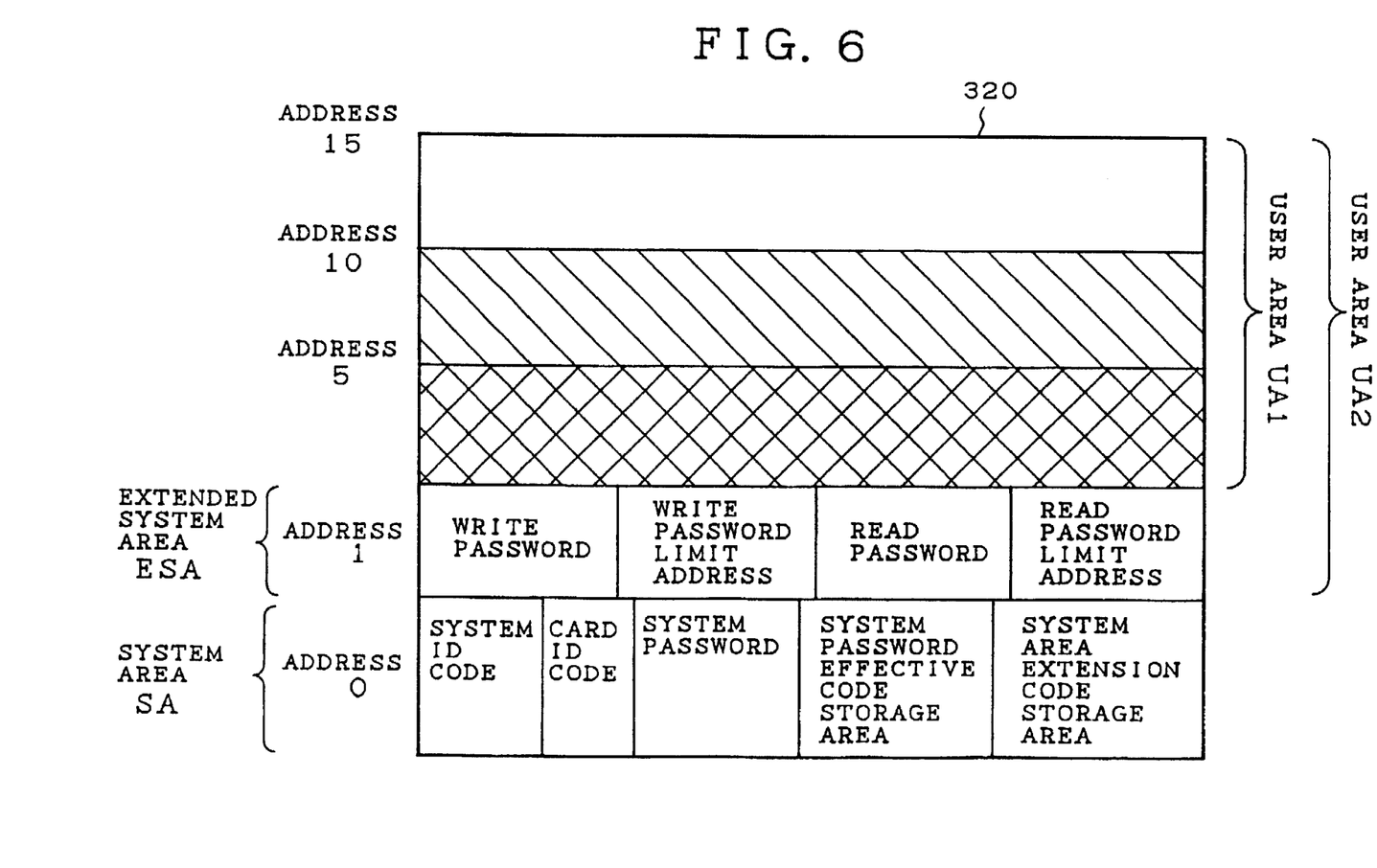
FIG. 6 is a diagram showing a memory map of a memory in the non-contact type IC card shown in FIG. 5.

FIG. 6 is a diagram showing a memory map of a memory 320. The same reference numerals are used for component parts identical with those shown in FIG. 2, and duplicate descriptions thereof are omitted. As shown in FIG. 6, a system area SA is provided at an address 0 in the memory 320, and includes a system area extension code storage area in addition to the contents shown in FIG. 2. When a system area extension code (second information) is written to the system area extension code storage area, an extended system area ESA is reserved at an address 1 as a system area. A read password, a read password limit address, a write password, and a write password limit address are stored on the extended system area ESA. The read password is used for collation when a user area is read, and the write password is used for collation when data is written to the user area. Further, the read password limit address indicates a high limit address under which the read password is made effective, and the write password limit address indicates a high limit address under which the write password is made effective. In this embodiment, the read password limit address is set to 10, and the write password limit address is set to 5. Further, in the embodiment, the system password effective code storage area uses a 7-bit area, and the system area extension code storage area uses a 1-bit area.

Figure 7:
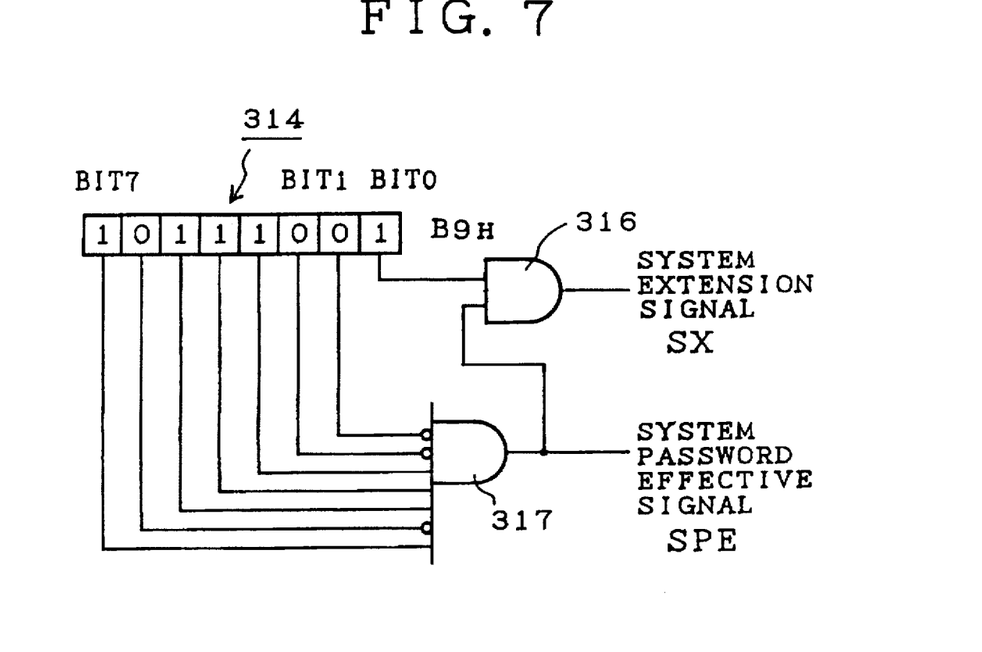
FIG. 7 is a diagram showing a circuit to generate a system password effective signal and a system extension signal, using an 8-bit register in the second embodiment.

FIG. 7 is a diagram showing a circuit to generate the system password effective signal SPE and a system extension signal SX. In the embodiment 1, all 8 bits are used to store the system password effective code as described above. However, in the embodiment, when the non-contact type IC card 300a is initiated, data in the system password effective code storage area is loaded to 7 bits from BIT1 to BIT7, and data in the system area extension code storage area is loaded to one bit BIT0. Reference numeral 317 denotes a gate to output a signal "H" as the system password effective signal SPE when "B8H" or "B9H" is stored in a register 314. Further, reference numeral 316 denotes a gate to output a signal "H" as the system extension signal SX only when "B9H" is stored in the register 314.

A description will now be given of the operation in the embodiment. Initially, when "B8H" is written onto an area including the system password effective code storage area and the system area extension code storage area of the system area SA in the non-contact type IC card 300a, the system extension signal SX becomes a signal "L", and the system password effective signal SPE becomes a signal "H". In this case, the system password is made effective for only the system area SA at the address 0. That is, an area other than the system area SA can be used as a user area UA2. Accordingly, as in the embodiment 1, the user area UA2 can be accessed without a password, and the access to the system area SA requires collation of the system password.

On the other hand, when "B9H" is written onto the area including the system password effective code storage area and the system area extension code storage area of the system area SA, both the system extension signal SX and the system password effective signal SPE become signals "H." Hence, as shown in FIG. 6, the system password stored in the system area SA is made effective for both of the extended system area ESA at the address 1 and the system area SA. That is, the access permitting means 312 decides whether or not system password collation by system password collating means 311 is necessary depending upon the system extension signal SX and the system password effective signal SPE.

Further, when the extended system area ESA is reserved, for the user area UA1, the user area password collating means 313 performs password collation by using the read password, the read password limit address, the write password, and the write password limit address. Subsequently, the access permitting means 312 decides whether or not a command inputted with a password can be permitted. Since the user area UA1 has addresses 2 to 15, the write password is made effective in an area from the addresses 2 to 10, and the read password is made effective in an area from the addresses 2 to 5. That is, the area at the addresses 2 to 5 requires both the read password and the write password. Thus, this area is suitable for storage of data, such as account data, having high degree of secrecy and requiring read/write operation after issue of the card. The area from the addresses 6 to 10 requires only the read password. Hence, this area is suitable for storage of data such as address, name, or telephone number, which may be only read out after the issue of the card. Further, an area from addresses 11 to 15 is accessible without a password. Therefore, this area is suitable for storage of data requiring no security. As set forth above, there are provided the two passwords including the write password and the read password. It is thereby possible to control the area by dividing the area into three types of areas having different security levels. Further, it is possible to vary the size of the respective areas by varying the limit addresses, and to efficiently control and use the memory.

Figure 8:
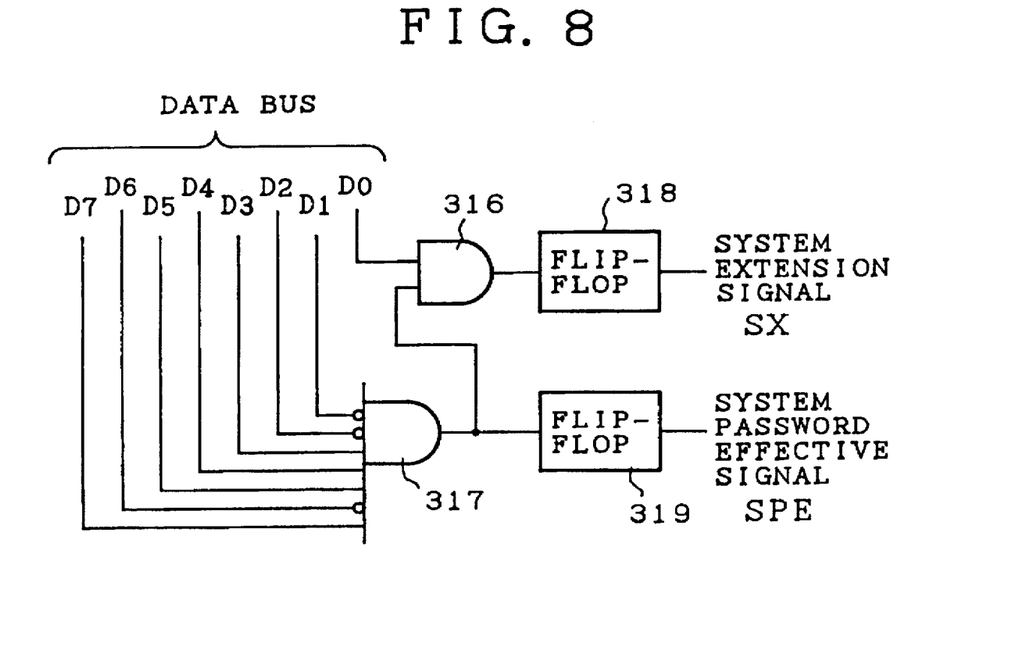
FIG. 8 is a diagram showing a circuit to generate a system password effective signal and a system extension signal, using two flip-flops in the second embodiment.

The 8-bit register 314 is employed to generate the system extension signal SX and the system password effective signal SPE in FIG. 7. However, it is to be noted that flip-flops 318 and 319 serving as 1-bit registers may be employed to directly latch the system extension signal SX and the system password effective signal SPE which are outputted as in the embodiment 1 described with reference to FIG. 4.

When data other than "B9H" and "B8H" may be stored in the system password effective code storage area and the system area extension code storage area of the system area SA, a command inputted from the read/write apparatus 200 can be executed without password collation.

As described above, in the embodiment, it is possible to reserve the extended system area in the user area, and to use the read password and the write password so as to control the access to the user area with higher security.

While preferred embodiments of the invention have been described using specific terms, such description is for illustrative purposes only, and it is to be understood that changes and variations may be made without departing from the spirit or scope of the following claims.

What is claimed is:

1. An IC card for communicating with an external apparatus, the IC card comprising:
  a memory divided into a system area and a user area, the system area having a system password storage area for storing a system password used for collation when the external apparatus accesses the system area, and a password information storage area for storing first information indicating that collation of the system password stored in the system password area is required when the system area is accessed;
  password collating means for, when the first information is stored in the password information storage area of the memory, collating a password sent from the external apparatus when the system area is externally accessed with the system password stored in the system password storage area; and
  access permitting means for, if the first information is stored in the password information storage area, permitting access by the external apparatus only when the passwords are identical as a result of collation by the password collating means, and for permitting access by the external apparatus without password collation if the first information is not stored in the password information storage area.

2. An IC card according to claim 1, wherein the system area further includes an extended system area information storage area for storing second information indicating that an area having a predetermined size in the user area is used as an extended system area, and wherein the access permitting means permits, if the second information is stored in the extended system area information storage area, access by the external apparatus when an inputted password is identical with the system password stored in the system password storage area as a result of collation by the password collating means when access is made to the extended system area by the external apparatus.

3. An IC card according to claim 2, wherein the extended system area has a user area password storage area for storing a user area password used for collation when access is made to the user area, wherein the IC card further having user area password collating means for, when the external apparatus accesses the user area with a password, collating the password with the user area password stored in the extended system area, and wherein the access permitting means permits the access to the user area when the passwords are identical with each other as a result of collation by the user area password collating means.

4. An IC card according to claim 3, wherein the user area password storage area includes a read password used for collation when a read command is sent together with a password from the external apparatus, and a write password used for collation when a write command is sent together with a password from the external apparatus, and wherein the user area password collating means collates the password with any one of the read password and the write password depending upon a type of a command inputted from the external apparatus.

5. An IC card according to claim 4, wherein the first information has a bit pattern other than a bit pattern appears on the memory immediately after the memory is fabricated.

* * * * *